9702X
J. S. ROBBINS.
THRASHING MACHINE.
Patented June 2, 1836.
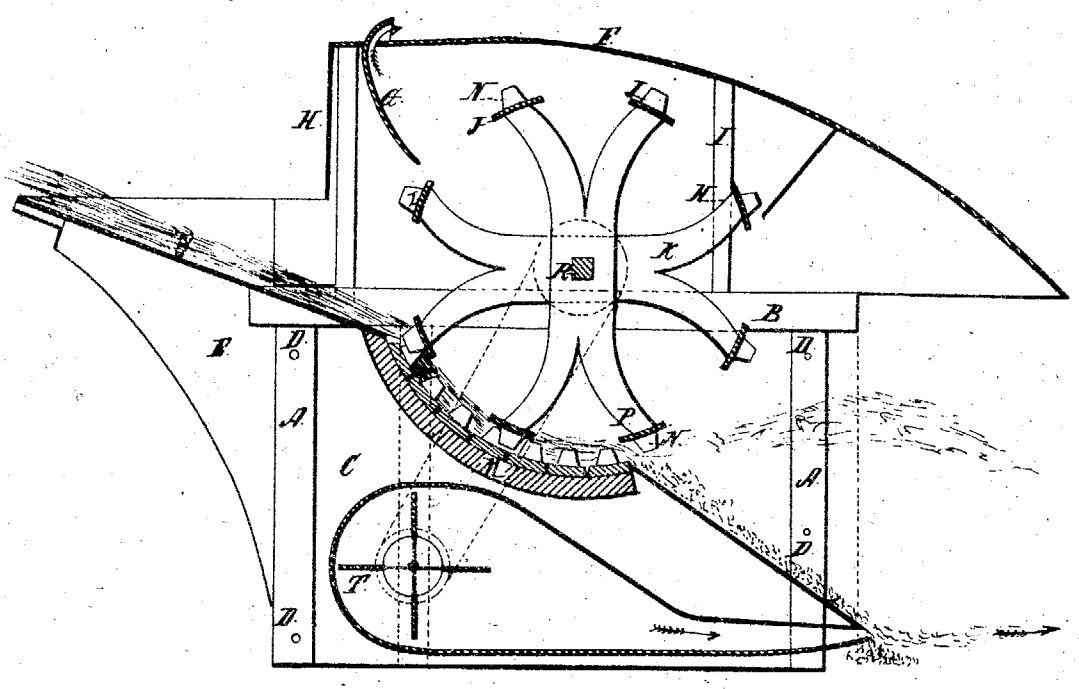

9702X June 2, 1836

Jacob S. Robbins. Gloucester Maine

Letters Patent

The Schedule referred to in these Letters Patent and making part of
the same containing a description in the words of the said Jacob S. Rob
bins himself of his improvement in the machine for thrashing Wheat
and other Grain.

To all ~~people~~ to whom these presents shall come. Be it known that
I Jacob S. Robbins of New Gloucester in the County of Cumberland &
State of Maine have invented a new and useful improvement in
a machine for thrashing Wheat and other grains and that the follow
ing is a full and exact description thereof
I make a frame thirty six inches long and twenty four or twenty
six inches high with four posts as in letter A doth appear on the
top of which is a girt (beam or) put on by means of a mortise & tenant as in letter
B doth appear. Then I band it on the inside with plank or thick
boards and let the posts into the bands and screw them on as in letter
C. doth appear. this is fastened together by means of iron rods or bolts
with nuts and screws as in letter D. doth appear. one end also is
banded up and on the same end is projecting pieces on which the
said Table rests as letter E doth appear. then I make a top or cover
to go over the beater wheel with sufficient lenth and breath to cover
the wheel and to prevent the grain and straw from flying too far
as in letter letter F. doth appear through the top of which I convey
the wind from the beater Wheel by means of a slant or circular band
or sheet iron. this band or sheet iron goes through the top or cover
and meets the teeth of the beater wheel in right form as to receive the
wind from the wheel and convey it back from the tender as in letter
G. doth appear. in the front end I leave a conveyance from
the table to the beater wheel as in letter H. doth appear. The
top or cover is fastened to the frame by means of four bolts turn 9702x June 2, 1836

[illegible] into the girts or beams as in letter F doth appear. The beater wheel
is made [illegible] Iron. I take four pieces of bar iron four inches wide
and one inch thick and as long as I want the beater wheel in diameter
put them across at right angles and then split each end of each bar
down within three inches of the centre. and spread them til they
come at right distances apart. then prepare each part with a [illegible]
[illegible] one inch square and so construct them as to fit the lugs and not
to come in the way of the teeth in the beater wheel lugs as letter J.
doth appear. when these pieces are so fitted will compose eight arms as
letter H. doth appear. Then I take eight pieces of bar Iron three
inches wide and one inch thick. and as long as I want the beater
wheel. and make a mortise in each end and so fit them as to receive
the before described arms and counter sink the mortise and rivet
the tenant as in letter L doth appear. then I take seven pieces
of bar iron for the concave. three inches wide and three fourths of
an inch thick. and place them on the before described frame in place
by means of a groove in a circular form as in letter M doth appear.
I make the teeth of [illegible] one inch and a half wide at the [illegible] end
and three fourths of an inch thick. and three inches long and taper
of each way to one inch wide and one fourth of an inch thick at
the top end as in letter N doth appear. these teeth are made with
two tenants one on each edge of the teeth about two fourths of an
inch through and to set into the lugs and concave pieces by shaping
them of and drilling them cold and countersinking the underside
and riveting them when cold as in letter O. doth appear. these teeth
are so set in the lugs and concave pieces as to pass by each other & not
to hit each other. then I take a square bar of iron for a shaft one
inch and one half square and put it through the before described
arms and fasten it on by means of bolts or keys as letter R. doth
appear. this shaft is turned and fitted to run on cast iron Boxes
these boxes are bolted down to the before described beams or girts. on
one end of the shaft is a pulley about eight inches in diameter as
letter P doth appear. on the said pulley goes a band from a hor- 9702x June 2, 1836 the Power which sets the machine in motion. Underneath the beater I fix a blower or fly wheel of sufficient bigness and is so constructed by means of a band from the beater wheel pully to the blower shaft which forces the wind out at the end of the machine and separates the Straw and chaff from the wheat as in letter T. doth appear.
What I claim as my own invention and not previously known in the above described machine is first. the way and manner of making the beater wheel and its being made wholey of cast Iron and the way and manner and form of making and setting the teeth with the tenents (and also the invention of the wind through the top of the machine) also the blower underneath the beater wheel Witnesses
A M Robbins
Nancy M Robbins
Robert Nevens Jacob S. Robbins [seal]

022 words

Drawing